(12) United States Patent
Taniguchi

(10) Patent No.: US 10,768,267 B2
(45) Date of Patent: Sep. 8, 2020

(54) POSITION ESTIMATING APPARATUS, POSITION ESTIMATING METHOD, AND TERMINAL APPARATUS

(71) Applicant: KABUSHIKI KAISHA TOSHIBA, Minato-ku, Tokyo (JP)

(72) Inventor: Kentaro Taniguchi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 18 days.

(21) Appl. No.: 15/902,253

(22) Filed: Feb. 22, 2018

(65) Prior Publication Data
US 2019/0162815 A1 May 30, 2019

(30) Foreign Application Priority Data

Nov. 30, 2017 (JP) .................................. 2017-230795

(51) Int. Cl.
*G01S 5/02* (2010.01)
*G01S 1/04* (2006.01)

(52) U.S. Cl.
CPC ............ *G01S 5/0263* (2013.01); *G01S 1/045* (2013.01); *G01S 5/0205* (2013.01); *G01S 5/0257* (2013.01)

(58) Field of Classification Search
CPC ........... G06K 9/00744; G06K 9/00791; G06K 9/3233; G06K 9/6215; G06K 2009/00328; G06K 9/00288; G06K 9/00677; G06K 9/00771; G06K 9/3241; G06K 9/78; H04W 4/023; H04W 4/025; H04W 4/043; H04W 4/02; H04W 4/027; G06T 7/73; G06T 2207/30244; G06T 7/20; G06T 2207/30241; G06T 7/246; G06T 7/74; G06T 7/254; G06T 2207/10016; G06T 2207/10024; G06T 2207/10028; G06T 2207/30252; G06T 1/0007; G06T 2207/10004; G06T 2207/20101; G06T 7/62; G06T 17/05; G06T 5/50; G06T 7/00; G06T 7/0002; G06T 7/77; G06T 11/00; G06T 3/40; G05D 1/0253; G05D 1/0272; G05D 1/00; G01S 5/0263; G01S 5/0205; G01S 5/0257; G01S 1/045

See application file for complete search history.

(56) References Cited

U.S. PATENT DOCUMENTS

| | | | |
|---|---|---|---|
| 7,995,117 B1 * | 8/2011 | Bonn | H04N 1/32128 348/231.3 |
| 2005/0002558 A1 * | 1/2005 | Franke | B60R 1/00 382/154 |
| 2005/0079880 A1 * | 4/2005 | Donner | H04Q 9/00 455/466 |

(Continued)

FOREIGN PATENT DOCUMENTS

JP 2013-245950 A 12/2013

*Primary Examiner* — Nimesh Patel
(74) *Attorney, Agent, or Firm* — Foley & Lardner LLP

(57) ABSTRACT

According to one embodiment, an electronic apparatus includes receiver circuitry and controller circuitry. The receiver circuitry is configured to receive a radio signal from a target apparatus. The controller circuitry is configured to estimate first position information of the target apparatus based on a captured image; and estimate second position information of the target apparatus based on both the first position information and information of the radio signal.

9 Claims, 6 Drawing Sheets

(56) References Cited

U.S. PATENT DOCUMENTS

| | | | |
|---|---|---|---|
| 2006/0244830 A1* | 11/2006 | Davenport | B61L 25/021 348/148 |
| 2007/0270168 A1* | 11/2007 | Sheynblat | G01S 5/0036 455/456.6 |
| 2008/0211671 A1* | 9/2008 | Daily | G06Q 20/18 340/572.1 |
| 2009/0222134 A1* | 9/2009 | Franke | G05B 19/4061 700/251 |
| 2014/0049654 A1* | 2/2014 | Okada | H04N 5/23206 348/207.1 |
| 2015/0119068 A1* | 4/2015 | Kudekar | H04W 4/043 455/456.1 |
| 2016/0343237 A1* | 11/2016 | Herman | G08B 25/008 |
| 2017/0223302 A1* | 8/2017 | Conlan | H04N 5/44504 |
| 2017/0352256 A1* | 12/2017 | Miwa | G08B 25/04 |
| 2018/0077538 A1* | 3/2018 | Matus | H04W 4/023 |

\* cited by examiner

POSITION ESTIMATING APPARATUS, POSITION ESTIMATING METHOD, AND TERMINAL APPARATUS

CROSS-REFERENCE TO RELATED APPLICATIONS

This application is based upon and claims the benefit of priority from Japanese Patent Application No. 2017-230795, filed on Nov. 30, 2017, the entire contents of which are incorporated herein by reference.

FIELD

Embodiments described herein relate to a position estimating apparatus, position estimating method, and terminal apparatus.

BACKGROUND

Technologies for estimating the position of an object using a camera image or radio communication have been extensively studied. The method using the camera can perform distance measurement to the object with high accuracy, and with a plurality of cameras, it is possible to estimate two-dimensional and three-dimensional position of the object. On the other hand, there is a disadvantage of having difficulty in measuring an object far from the camera, and thus, having difficulty in grasping the object even by image processing depending on the situation. With a method using radio communication, it is possible to estimate the position of the object over a wide area and detect an identifier (ID) of the object from the communication content to identify the object. On the other hand, an influence of attenuation, reflection, diffraction in the radio propagation path, an influence of radio circuit distortion, or the like, might increase an error, leading to a disadvantage of having difficulty in performing highly accurate position estimation.

In order to solve this problem, a position estimation technology using both radio communication and camera image has been developed. For example, a mobile body equipped with a global positioning system (GPS) receiver and a camera detects its self-position with high accuracy. The position is estimated by the GPS at a place where GPS reception is available, and the amount of movement is grasped by a camera image to estimate the self-position at a place where GPS reception is unavailable. However, conventional techniques use position estimation results by radio (GPS) in the place where the radio (GPS) can be received, making it difficult to improve estimation errors due to radio (e.g., errors due to propagation path, noise, synchronization errors). Moreover, this technique assumes GPS alone as a radio, making it difficult to be applied in areas where GPS is not available.

DETAILED DESCRIPTION

According to one embodiment, an electronic apparatus includes receiver circuitry and controller circuitry. The receiver circuitry is configured to receive a radio signal from a target apparatus. The controller circuitry is configured to estimate first position information of the target apparatus based on a captured image; and estimate second position information of the target apparatus based on both the first position information and information of the radio signal.

Hereinafter, embodiments will be described in detail with reference to the drawings. In the explanation, a person or thing to be an object of position estimation is called a "target". For example, it is assumed that the target carries (mounts) a target terminal such as a smartphone, a tablet or a beacon, capable of transmitting and receiving radio waves. Alternatively, the target terminal itself may be a target.

First Embodiment

A position estimating apparatus according to the present embodiment intends to complementarily enhance the accuracy of the position estimation of the target using both the position estimation by the camera imaging and the position estimation by radio.

Figure 1:
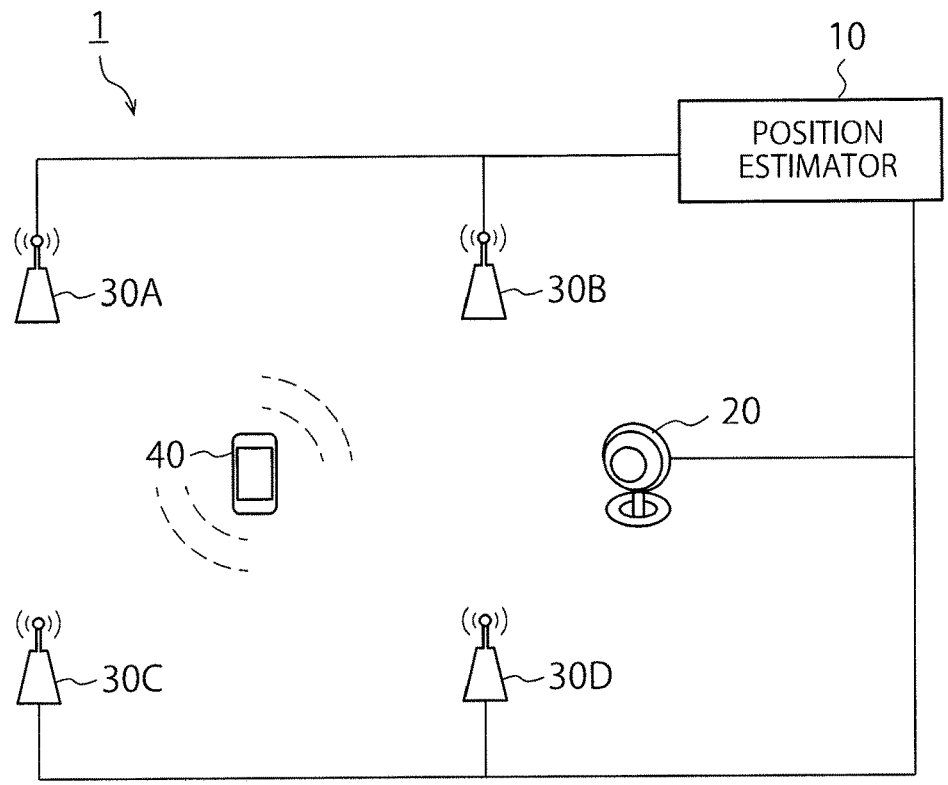
FIG. 1 is a diagram illustrating a configuration of a position estimating apparatus according to an embodiment.

FIG. 1 is a diagram illustrating a configuration example of a position estimating apparatus 1 according to the present embodiment. The position estimating apparatus 1 includes a position estimator 10, an imager 20, and a communicator 30, and estimates the position of a target including a target terminal 40.

While this is an exemplary case including one imager 20 and four communicators 30, namely, communicators 30A to 30D, the configuration is not limited to this example, and any number is allowable as long as position information is appropriately obtained. For example, two or more imagers 20 may be provided, and one, two, three, or five or more communicators 30 may be provided. Moreover, the number of the target terminals 40 is not limited to one, and a plurality of target terminals 40 may be present, and the position estimation of the plurality of target terminals 40 may be performed at the same timing in parallel or at mutually different timings.

While the position estimator 10, the imager 20, and the communicator 30 are configured separately, the configuration is not limited to this example, and may be configured as an integrated unit. Alternatively, a portion of the functions of the position estimator 10 may be mounted on the imager 20 or the communicator 30, and the remaining functions may be mounted on an external device. Furthermore, there is no need to provide the imager 20 in the position estimating apparatus 1, and a camera or the like installed separately from the position estimating apparatus 1 may substitute the imager 20.

For example, the plurality of imagers 20 and the plurality of communicators 30 may be installed to estimate the position of a moving vehicle or work vehicle in a factory, track a flow line of a visitor in a shopping mall, or monitor patient behavior within a hospital.

An example of the imager 20 is a camera to capture an image within a predetermined region and output the captured image to the position estimator 10. The imaging may be performed at predetermined timings or may be performed in a case where a target is detected to be present within a predetermined region by a separate detector. Alternatively, the imaging may include imaging of a moving image and outputting the image to the position estimator 10.

The communicator 30 includes at least a receiver to receive a radio, and receives the radio (e.g., radio waves) information from the target terminal 40. The radio information may be anything available for estimating the position of the target terminal 40, and may be received power, reception timing, reception direction, for example. Alternatively, in addition to these pieces of information, there may be information indicating a decoding result of a radio signal, an error vector magnitude (EVM) of the radio signal, and a frequency spectrum, or the like. The received information is output to the position estimator 10. In addition to this, the communicator 30 may include a transmitter to transmit the information estimated by the position estimator 10 to the target terminal 40.

Figure 2:
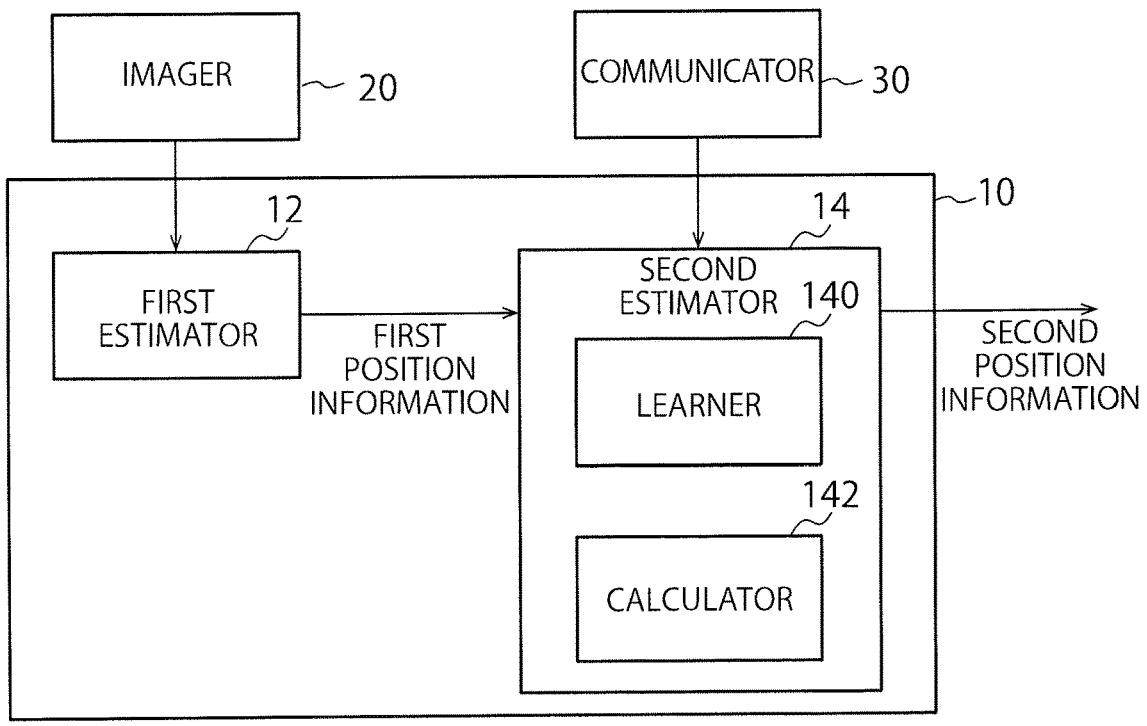
FIG. 2 is a block diagram illustrating functions of a position estimator according to an embodiment.

FIG. 2 is a block diagram illustrating an example of functions of the position estimator 10. The position estimator 10 includes a first estimator 12 and a second estimator 14. Although not illustrated, there may be a position estimation controller to control these position estimators. Moreover, there may be a controller to control the functions of the components of the position estimating apparatus 1. That is, the controller (not illustrated) may perform various types of controls of the position estimating apparatus 1 described below. This controller may be mounted as a control circuit on a processor configured with a digital or analog circuit.

The first estimator 12 estimates first position information on the basis of the information imaged by the imager 20. The first position information is position information obtained from the image captured by the imager 20 and is estimated by analyzing the image. Examples of the first position information include a distance to the target, orientation, the number of targets, the coordinates of the target.

The second estimator 14 estimates second position information on the basis of the estimated first position information and the communication from the target received by the communicator 30. In this manner, the second position information is estimated by analyzing the image captured by the imager 20 and the data received from the communicator 30.

The second estimator 14 includes a learner 140 and a calculator 142. The learner 140 performs learning to enhance accuracy of position estimation from a state of radio waves received by the communicator 30 on the basis of the first position information. The learner 140 calculates, for example, parameters for estimating a position from the received radio waves, by learning. As another example, it is allowable to generate a model such as a neural network.

Using the parameter or model learned by the learner 140, the calculator 142 estimates and outputs the second position information from the first position information and the state of the radio waves received by the communicator 30 by calculating the second position information. The information may be output via standard output of the position estimator 10 or to an internal memory, or may be transmitted as a radio signal from the communicator 30 and a position estimation result may be notified to the target terminal.

Figure 3:
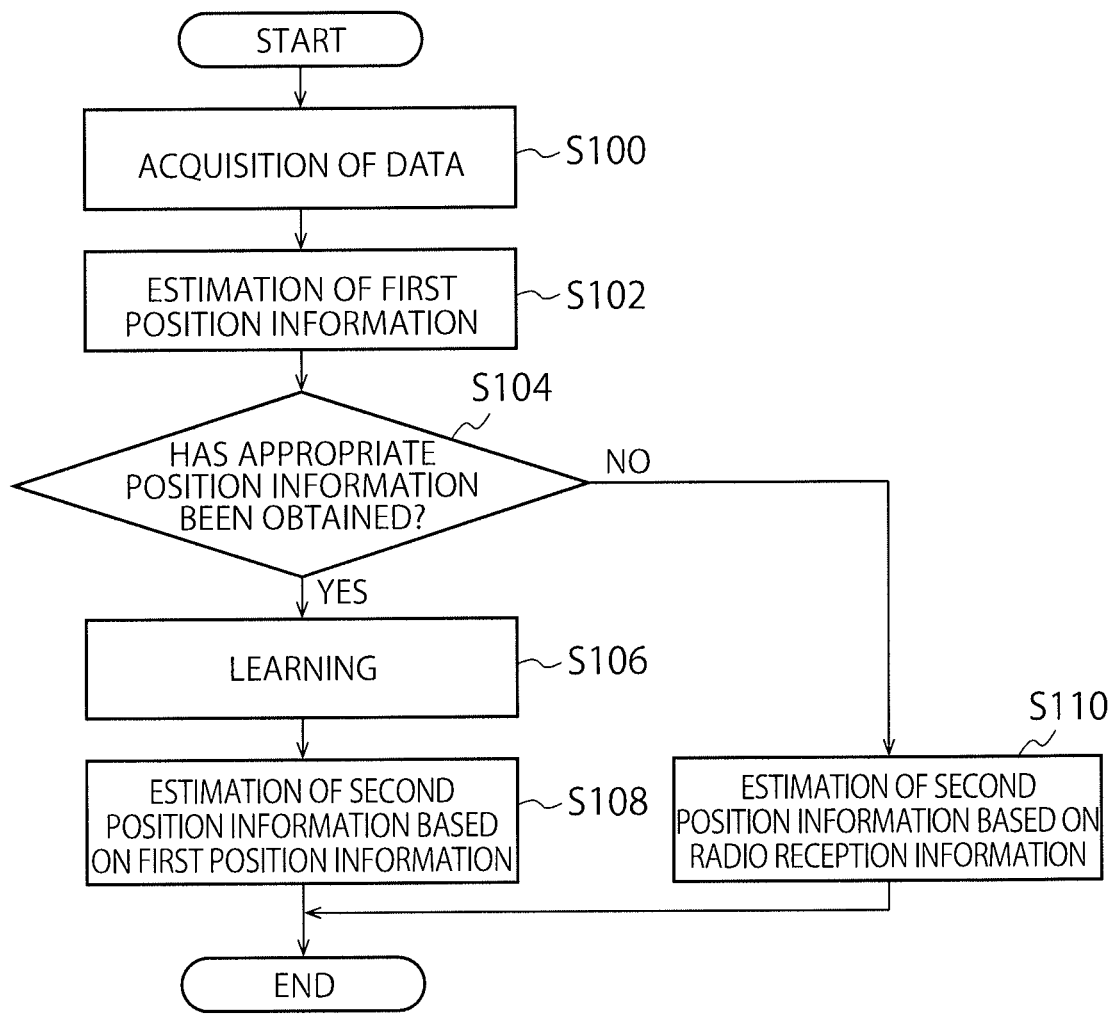
FIG. 3 is a flowchart illustrating operation of a position estimating apparatus according to an embodiment.

FIG. 3 is a flowchart illustrating operation of the position estimating apparatus 1. Hereinafter, operation of the position estimating apparatus 1 will be specifically described using this flowchart.

First, the position estimating apparatus 1 obtains data related to the target terminal 40 (S100). The data related to the target terminal 40 is data of an image of the target terminal 40 captured by the imager 20 or the state of the radio waves transmitted from the target terminal 40, received by the communicator 30.

Next, the first estimator 12 estimates the first position information (S102). For example, the first estimator 12 estimates the position of the target terminal 40 on the basis of information such as the position and the size of the target terminal 40 included in the image captured by the imager 20, within the image. This algorithm is not particularly limited, as long as it is an algorithm capable of appropriately calculating the position from the image. In a case where the plurality of imagers 20 is provided, it is also possible to enhance the accuracy by using the images captured by the plurality of imagers 20.

Next, the second estimator 14 determines whether the first position information has been obtained as appropriate position information (S104). For example, in a case where an appropriate result such as a distance to the target terminal 40 and coordinates has been output as the first position information, it is determined that highly accurate position estimation is possible from the image captured by the imager 20.

As another example, when the first estimator 12 estimates the first position information, the determination of S104 may be performed by executing correlation calculation with the image of the target terminal 40, calculating a sharpness value of the target terminal 40 and determining whether the sharpness value exceeds a threshold. The object of imaging by the imager 20 is not limited to the target terminal 40, and may be an image of a person carrying the target terminal 40 or an image of anything on which the target terminal 40 is present.

In a case where it is determined that appropriate position information has been obtained as the first position information (S104: YES), parameters (hereinafter referred to as radio parameters) used for radio position estimation processing is learned (S106) on the basis of the first position information. The radio parameters include a time offset of radio communication, a coefficient of a propagation path model, or a coefficient used in a signal processing algorithm, and the accuracy of position estimation is determined by these parameters. Details on learning of radio parameters will be described below.

Next, the second position information is estimated (S108) on the basis of the first position information and the state of the radio waves received by the communicator 30. In a case where it is determined in S104 that sufficient accuracy has been obtained as the first position information, the first position information may be output as it is as the second position information, or may be corrected or arithmetically processed using the radio reception information to be used as the second position information. The state of the received radio waves may be additionally used in this correction and arithmetic processing. The correction using the radio reception information may be any correction as long as the first position information estimated from the imaging information is corrected on the basis of provisional position information estimated from the radio reception information. Exemplary correction may be correction to weight-average the first position information estimated from the imaging information and the provisional position information estimated from the radio reception information.

In contrast, in a case where it is determined that appropriate position information has not been obtained as the first position information (S104: NO), it is determined that appropriate detection of the target terminal 40 failed on the imager 20, and radio-based position estimation is performed in the second estimator 14 (S110). The second estimator 14 performs position estimation using the radio parameter already learned by the learner 140 or the radio parameter held in advance, and the calculator 142 calculates and estimates the second position information.

In this manner, in a case where the target terminal 40 is detectable by the imager 20, the radio parameter learning is performed while image-based position estimation is performed. In a case where the target terminal 40 is not detectable by the imager 20, the learned radio parameter or the radio parameter previously held is used to perform position estimation on the basis of the radio information received by the communicator 30. This makes it possible to appropriately learn the radio parameters to enhance the accuracy of the position estimation processing using the radio.

Figure 4:
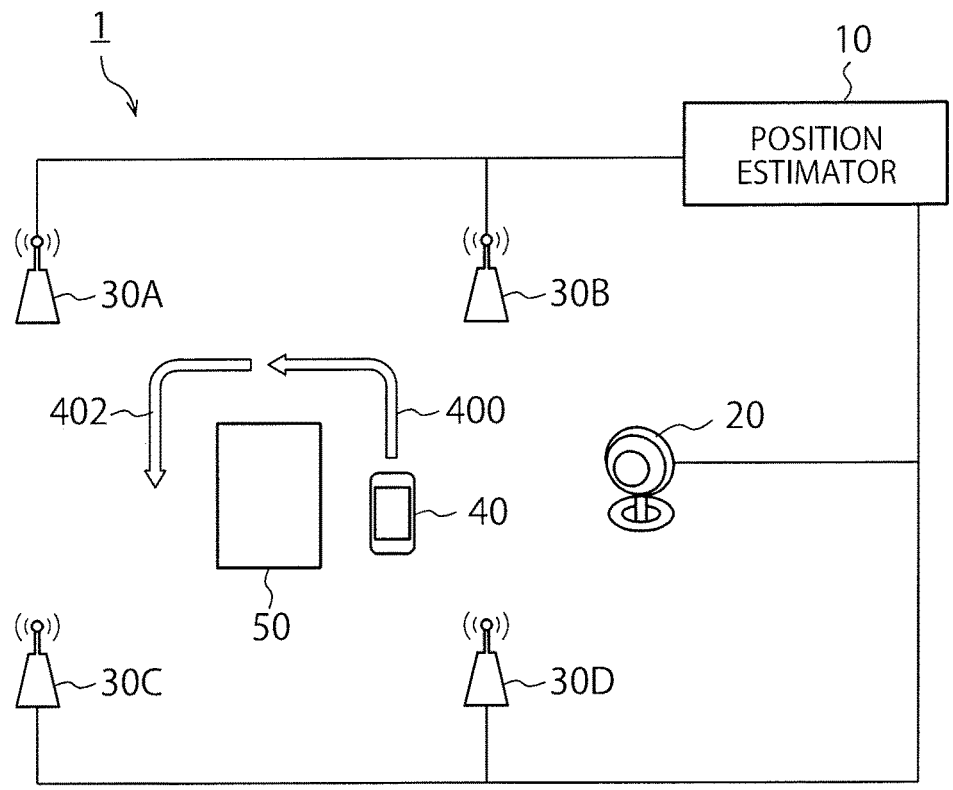
FIG. 4 is a diagram illustrating an installation example of a position estimating apparatus according to an embodiment.

FIG. 4 is a diagram illustrating another example of installation of the position estimating apparatus 1. Unlike FIG. 1, this figure includes an obstacle and a position where imaging of the target or the target terminal 40 by the imager 20 would be difficult.

A case where there is a shield 50 to shield the imager 20 within a region where position estimation is performed will be examined. In this case, in a situation that the target terminal 40 retreats to the backside of the shield 50 with respect to the imager 20, imaging of the target terminal 40 might be hindered, making it difficult to estimate the distance on the basis of the imaged information.

In a case where the target terminal 40 is moving along a route 400 within the range visible from the imager 20, the imager 20 can recognize the target terminal 40, and thus, the imaging information of the imager 20 can be used to perform the first position estimation. At the timing when it is possible to perform the first position estimation, the learner 140 performs learning for the second position estimation.

In another case where the target terminal 40 is moving along a route 402 outside the visible range of the imager 20, the calculator 142 of the second estimator 14 calculates and estimates the second position information on the basis of the radio reception signal received by the communicator 30 and using the radio parameter learned above.

In this manner, the learner 140 learns the radio parameters on the basis of the estimation result of the first position information within the range that can be imaged by the imager 20, making it possible to enhance the accuracy of position estimation using radio even in a case where the target terminal 40 is present in a range that cannot be imaged by the imager 20 because of the shield 50. This is because highly accurate position estimation results by the imager 20 such as a camera are available as teacher data for learning the radio parameters.

Next, a specific example of the radio position estimation method and radio parameters will be described. Position estimation techniques via radio include a method of using an arrival time of the radio signals, a method of using a received power, a method of using an arrival direction.

In the use of the arrival time, an arrival time $t_i$ of the radio signal from the target terminal 40 in the ith communicator 30 of a plurality of communicators 30 (assumption) is given by the following expression.

$$t_i = \frac{d_i}{c} + \Delta T_i \quad (1)$$

where c is a speed of light, $d_i$ is a distance between the ith communicator 30 and the target terminal 40, and $\Delta T_i$ is a time offset. This Formula (1) can be transformed into the following expression.

$$d_i = (t_i - \Delta T_i) \cdot c \quad (2)$$
$$\cong t_i \cdot c$$

That is, when the time offset $\Delta T_i$ is sufficiently small, the distance $d_i$ between each of the communicators 30 and the target terminal 40 can be estimated by observing the arrival time $t_i$ of the radio signal.

At this time, by estimating the distance with at least three communicators 30, it is possible to calculate and estimate the position of the target terminal 40 according to the principle of trilateration.

The time offset $\Delta T_i$ in Formula (1) can be a cause of estimation errors. The time offset is an error caused by clock deviation between the target terminal 40 and each of the communicators 30, reflection on the propagation path, radio circuit distortion, or the like. When the influence of this time offset is large, Formula (2) would not be established, leading to deterioration of position estimation accuracy.

In the present embodiment, as an example, the time offset is defined as a radio parameter to perform learning using the estimation result of the first position information by the imager 20. In a case where the target terminal 40 is present within an region that can be imaged by the imager 20 as the route 400, highly accurate camera-based position estimation is possible, in which an estimation result of the first position information is assumed as [x0, y0]. Hereinafter, for the sake of simplicity, description will be given in a two-dimensional coordinate system, while the similar operation will apply to the three-dimensional system.

When the coordinates of the ith communicator 30 are [xi, yi], the distance from the target terminal 40 to the ith radio station can be approximated as follows.

$$d_i \approx \sqrt{(x_0-x_i)^2 (y_0-y_i)^2} \quad (3)$$

From Formulas (1) and (3), the time offset $\Delta T_i$ to be the cause of an error can be calculated as follows.

$$\Delta T_i \cong t_i - \frac{\sqrt{(x_0 - x_i)^2 + (y_0 - y_i)^2}}{c} \quad (4)$$

Every time the coordinates [x0, y0] estimated as the first position information and reception time information $t_i$ via the communicator 30 are obtained, the value of the time offset in each of the communicators 30 is calculated on the basis of Formula (4). After the time offset is obtained, it is possible to accurately calculate the distance to the target terminal 40 expressed by Formula (2), making it possible to enhance the accuracy of position estimation calculated on the basis of the distance.

In a case where the imager 20 can detect the target terminal 40, estimation of the first position information using the imaging information by the imager 20 is executed while the time offset as the radio parameter is estimated. In a case where the target terminal 40 is undetectable by the imager 20, the value of the estimated time offset so far would be used to estimate the second position information based on the arrival time of the radio, making it possible to achieve highly accurate position estimation.

To achieve an effect of enhanced accuracy of estimation, there is a need to have a same time offset in execution of camera-based position estimation and radio-based position estimation. The time offset is not always the same value because of the presence of fixed components attributed to the hardware of the target terminal 40 and the communicator 30 and variation components attributed to the propagation path. Still, it is at least possible to reduce the influence of fixed components.

Moreover, in the present embodiment, since the time offset is continuously calculated during execution of the camera-based position estimation, it is possible to learn the time variation and statistical properties of the time offset. Therefore, in execution of the radio-based position estimation, the influence of time offset can be reduced using the learned statistical properties. The statistical properties may include an average value, a variance value, a probability density function of a radio parameter, for example.

With this technique, it is possible to reduce the influence of the time offset without calibrating the deviation of the clock between the communicators 30.

While the technique based on arrival time has been described as an exemplary position estimation technique by radio, a technique based on received power may also be applied as described above. The received power of the radio signal can be defined in free space as follows.

$$R_i = P_{tx} - 20 \cdot \log_{10}(d_i) \quad (5)$$

where $R_i$ is a received power at the ith communicator 30, $P_{tx}$ is a transmission power at the target terminal 40, and $d_i$ is a propagation distance. By transforming Formula (5), the following propagation distance can be obtained.

$$d_i = 10^{\wedge}\left\{\frac{(P_{tx} - R_i)}{20}\right\} \quad (6)$$

The actual position estimation environment is not necessarily a free space, and thus, Formula (6) might not be established according to the influence of an obstacle, or the like, in many cases. Therefore, it is also allowable to introduce a variation parameter α at the time of position estimation to define the distance $d_i$ on the basis of the following form.

$$d_i = 10^{\wedge}\left\{\frac{(P_{tx} - R_i)}{\alpha}\right\} \quad (7)$$

This variation parameter α is a parameter determined by the propagation environment. Application of an accurate parameter setting value would be able to enhance the estimation accuracy of the propagation distance to achieve accurate position estimation.

In a case of executing position estimation using the received power of radio signals, α in Formula (7) is learned as a radio parameter. In a case where the target terminal 40 is detectable from the imager 20, it is possible to obtain the distance $d_i$ on the basis of Formula (3), and thus, possible to use the known transmission power $P_{tx}$ and the observed value $R_i$ of the received power to calculate the radio parameter α by Formula (7).

The radio parameter α is calculated and statistical properties thereof are learned every time the first estimator 12 estimates the first position information on the basis of the information obtained from the imager 20. In a case where the target terminal 40 is undetectable by the imager 20, the value of a learned so far or the learned statistical properties would be used to estimate the second position information on the radio power basis, making it possible to achieve highly accurate position estimation. In a case where the transmission power $P_{tx}$ in the target terminal 40 is unknown, $P_{tx}$ may be used as a radio parameter in addition to α.

As still another example of the radio parameter, a weighting coefficient $c_i$ representing the reliability of each of the communicators 30 may be defined as a parameter. When observation data observed by the ith communicator 30 is defined as $o_i$, the distance $d_i$ between the ith communicator 30 and the target terminal 40 is expressed as follows.

$$d_i = f(o_i) + \frac{1}{c_i} \quad (8)$$

where $f(\bullet)$ is a function that converts the observation data to the distance. When the observation data is the propagation time, this case corresponds to Formula (2), and when the observation data is received power, this corresponds to Formula (7). The portion $1/c_i$ in the second term corresponds to an observation error, and the greater the weighting coefficient $c_i$ representing reliability, the smaller the error.

As an example, this weighting coefficient $c_i$ may be learned as a radio parameter. The learning method is similar to the case of other parameters. Learning this weighting coefficient $c_i$ makes it possible to perform processing such as position estimation processing by weighting an observed value in each of the communicators 30 or position estimation using the communicator 30 with less observation error, leading to enhancement of the estimation accuracy of the second position information.

As still another example, a parameter related to the position estimation algorithm or the filtering algorithm may be set as the radio parameter. The position estimation algorithm is an algorithm related to signal processing of calculating actual positioning coordinates from observation data in the communicator 30, and includes various techniques such as a triangulation method, a maximum likelihood estimation method, and a least squares method. The filtering algorithm is an algorithm related to signal processing of smoothing observation data or positioning coordinates, and includes various techniques such as a Kalman filter and a particle filter.

Furthermore, these position estimation and filtering algorithms may have their own internal parameters in some cases. That is, there are cases where a plurality of algorithms and parameter setting candidates are conceivable. In such a case, the present embodiment can also be applied as a means for selecting an optimum candidate.

For example, the following is a case where there are the following candidates as combinations of algorithms and parameters.
Candidate 1: (Algorithm 1, parameter A)
Candidate 2: (Algorithm 2, Parameter B)
Candidate 3: (Algorithm 3, parameter C)
Candidate 4: (Algorithm 4, Parameter D)

In this case, the learner 140 may be configured to learn which candidate is most probable. Specifically, at the timing when the target terminal 40 is in a region where the target terminal 40 can be imaged by the imager 20, estimation processing of the second position information by the combination of the candidate algorithms and parameters is performed in parallel with the estimation processing of the first position information based on the imaging information obtained by the imager 20. The degree of similarity in the estimation result by each of the candidates with respect to the position estimation result by the imager 20 is learned. In this learning, for example, a candidate having the highest correlation with the first position information is employed for radio estimation processing.

The position estimation technique by radio include various observation means and algorithms other than those described above. In any case, the present embodiment is applicable with some radio parameter settings. In the case where highly accurate position detection is possible via a camera, by learning the value or statistical properties of the radio parameter and reflecting the learning result, it is possible to perform highly accurate position estimation processing in performing radio-based position estimation in a region where imaging by the camera is not available.

While the present embodiment illustrates a case where the camera is used as a means for enabling highly accurate position estimation and the radio is used as a low-accuracy position estimating means, another means may be used. For example, it is allowable to have a configuration to use a positioning satellite with very high accuracy and less error instead of the camera.

As described above, according to the present embodiment, position estimation using the camera (imager 20) and position estimation using radio (communication by the communicator 30) are complementarily used to enhance position estimation accuracy. That is, in a case where a target is present in a range that can be imaged by the camera, highly accurate position estimation based on the imaged information is performed while parameters for position estimation using radio are learned. In a case where there is no target within the range that can be imaged by the camera, position estimation using radio is performed using the learned parameters, making it possible to perform highly accurate position estimation even when the position estimation using the camera is not available.

Note that in a case where the environment in which the imager 20 and the communicator 30 are installed does not change so much, it is also possible to hold the radio parameters in advance as described above. In this case, for example, the parameters may be calculated and set on the basis of installation situation of the imager 20 and the communicator 30 or the like. As described above, in a case where the radio parameters are set in advance, there is no need to provide the learner 140 in the second estimator 14.

Second Embodiment

In addition to the above-described embodiment, the present embodiment is intended to obtain the reliability of the estimation result of the first position information obtained from the imaging information captured by the imager 20 and to change the estimation method of the second position information on the basis of the reliability.

Figure 5:
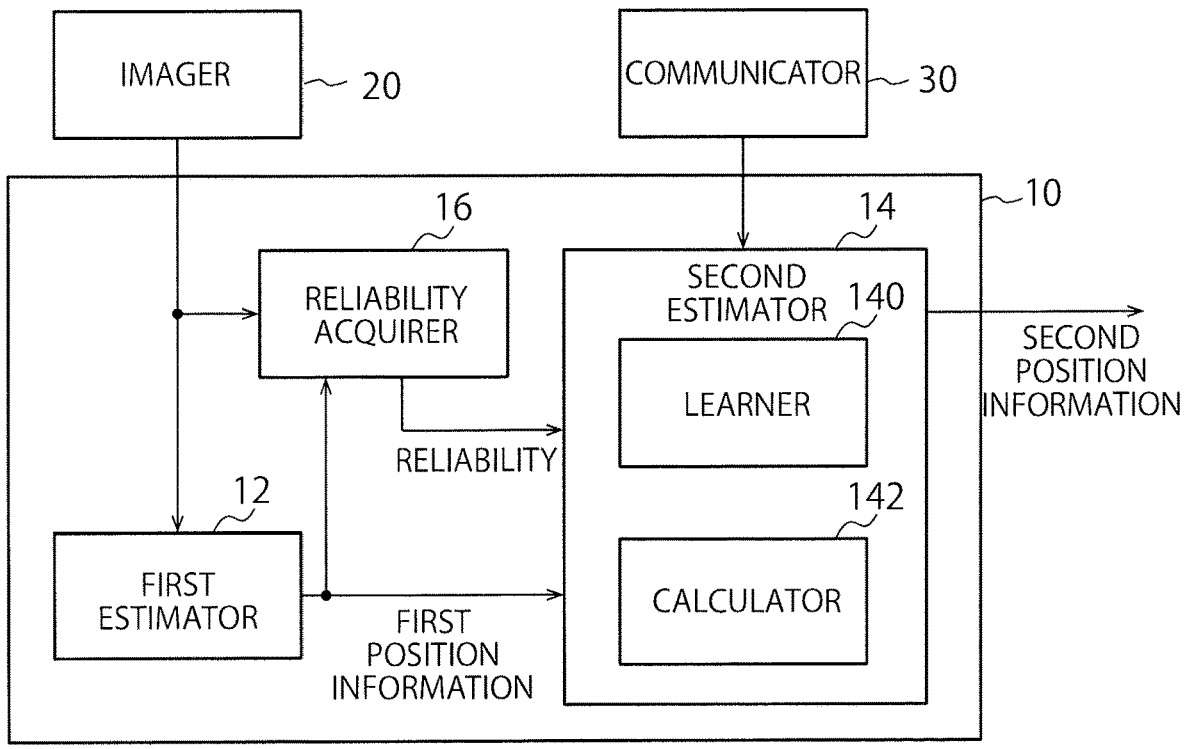
FIG. 5 is a block diagram illustrating another example of a position estimator according to an embodiment.

FIG. 5 is a block diagram illustrating functions of the position estimator 10 according to the present embodiment. The position estimator 10 further includes a reliability acquirer 16 configured to receive the imaging information from the imager 20 and the first position information from the first estimator and to obtain the reliability on the basis of the imaging information to output the obtained reliability to the second estimator 14.

The reliability acquirer 16 obtains reliability of the first position information on the basis of the imaging information received from the imager 20. Examples of means for judging the reliability include the presence or absence of the target terminal 40 included in the imaging information, the size of the region occupied by the target terminal 40 within the imaging information (the number of pixels within the image), the brightness of the imaging environment, and sharpness. As described above, while the position estimation by the imager 20 can achieve highly accurate estimation results, sufficient accuracy may not be obtained depending on the imaging environment.

For example, there is a possibility that sufficient accuracy cannot be obtained in an environment where the distance to the target terminal 40 is long, the imaging region is dark, or the like. The reliability acquirer 16 calculates and obtains the reliability of the imaging information, thereby notifying the second estimator 14 as to whether the estimation of the first position information is performed with sufficiently high accuracy.

The second estimator 14 learns the radio parameters and estimates the second position information using the input first position information, the reliability thereof, and the radio reception information from the communicator 30.

Figure 6:
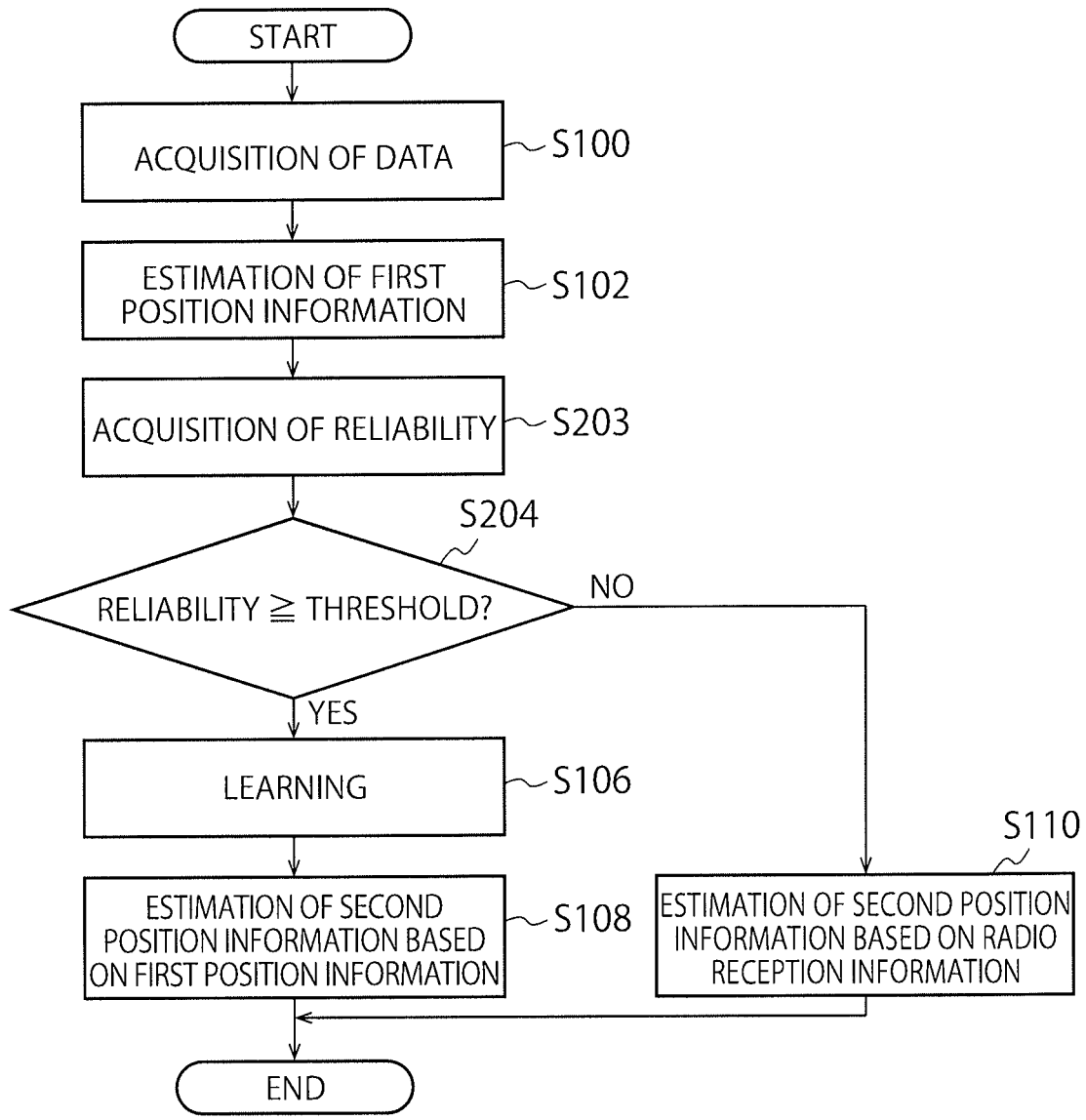
FIG. 6 is a flowchart illustrating another example of operation of a position estimating apparatus according to an embodiment.

FIG. 6 is a flowchart illustrating operation of the position estimating apparatus 1 according to the present embodiment. In the figure, the same reference numerals as those in FIG. 3 denote the same processing.

After estimating the first position information by the first estimator 12 (S102), the reliability acquirer 16 obtains reliability (S203) on the basis of the imaging information transmitted from the imager 20 and the first position information estimated by the first estimator 12. As described above, the reliability is obtained from imaging information (image) captured by the imager 20.

For example, the number of pixels occupied by the target terminal 40 in the image is obtained as the reliability. Other examples include statistics of gray scale values of all the pixels in the image, statistics obtained from saturation and brightness of all pixels in the image, values obtained from sharpness of a portion or whole of the image. In the case of using sharpness, for example, a differential filter such as a Laplacian filter is applied to the image, edge detection is performed by a Canny filter or the like, statistics of the pixel value after filtering are calculated to obtain the reliability. The statistics means at least one value among total, average, variance, or the like.

Next, the second estimator 14 determines whether the reliability obtained by the reliability acquirer 16 is a predetermined threshold or more (S204). The predetermined threshold may be a preset value or may be automatically determined by the second estimator 14 in operating long-term camera-based or radio-based position estimation. Note that "the threshold or more" may be read as a value larger than the threshold.

When the reliability is the threshold or more, the operation from S106 is performed, and if not so, the operation from S110 is performed.

As described above, according to the present embodiment, the camera-based and the radio-based estimation can be performed to enhance the accuracy of position estimation similarly to the above-described embodiment. Furthermore, on the basis of the reliability of the camera-based position estimation, it is determined whether to learn the radio-based position estimation or to calculate the radio-based second position information. As a result, learning by the second estimator 14 can be performed on the basis of the result in a case where the camera-based position estimation has high reliability, making it possible to enhance the accuracy of estimating the second position information by the second estimator 14.

Third Embodiment

While the second embodiment described above is a case where reliability is obtained on the basis of the information obtained from the imager 20, the present embodiment is intended to obtain the reliability further on the basis of the information obtained from the communicator 30.

Figure 7:
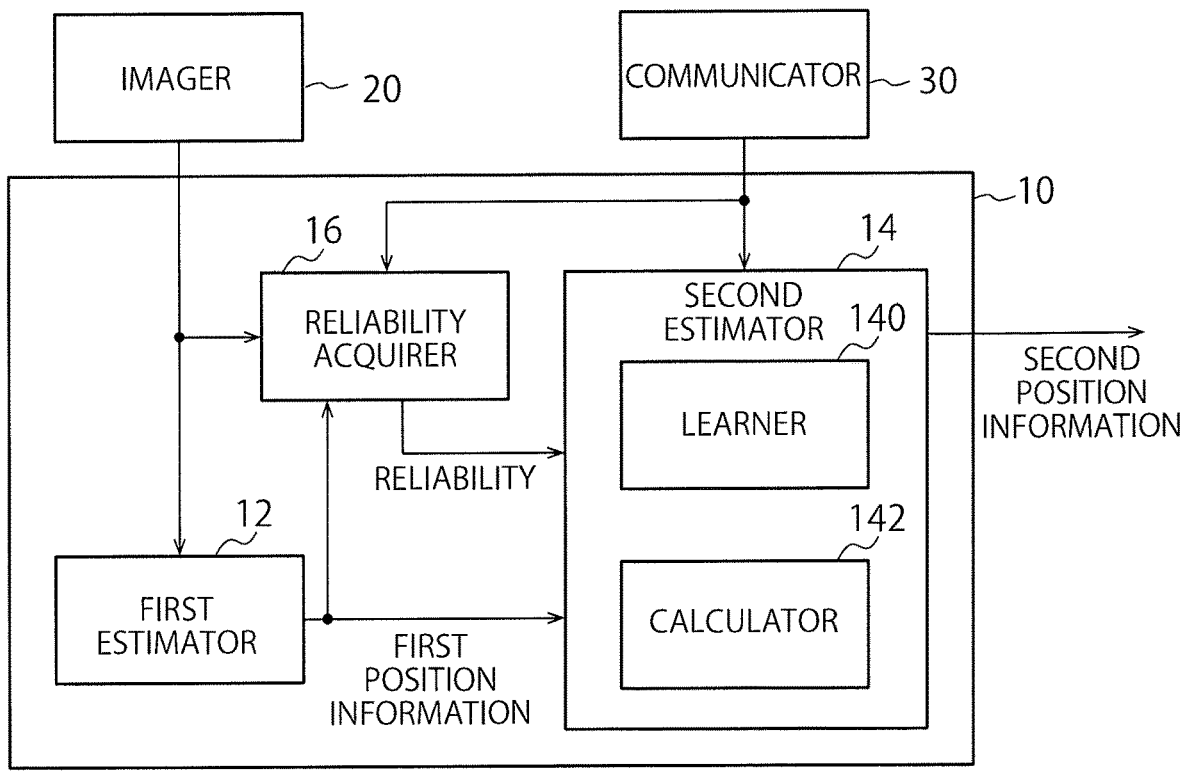
FIG. 7 is a block diagram illustrating still another example of a position estimator according to an embodiment.

FIG. 7 is a block diagram illustrating a configuration of the position estimator 10 according to the present embodiment. The difference from the second embodiment described above is that the radio reception information in the communicator 30 is also input into the reliability acquirer 16.

The reliability acquirer 16 obtains the reliability in the estimation of the first position information on the basis of the radio reception information from the communicator 30 together with the imaging information from the imager 20. The radio reception information received by the communicator 30 is used as supplementary information to grasp the presence or absence of the target terminal 40 in the imaging information or the number of target terminals 40.

The use of the radio enables acquisition and recognition of an identifier (ID) of a radio signal. The ID of the transmission source of the radio signal is recognized via decoding processing of the received radio signal, making it possible to accurately grasp the number of target terminals 40 surrounding the communicator 30. Furthermore, by estimating at least one of the received power, the arrival time, the arrival direction, etc. of the signal transmitted from the target terminal 40, it is possible to recognize the approximate position of the target terminal 40.

In the present embodiment, by inputting these pieces of information obtained from the radio reception signal to the reliability acquirer 16, it is possible to more accurately calculate the reliability of the position information estimated from the imaging information of the imager 20. Specifically, the number of the target terminals 40 and the position-related information obtained from the imaging information of the camera are compared with corresponding information obtained from the radio reception information, and in a case where the correlation between these is high, it is possible to calculate and obtain the reliability as a high level.

As described above, according to the present embodiment as well, similarly to the above-described embodiment, it is possible to enhance the position estimation accuracy by performing camera-based and the radio-based estimation and possible to determine whether to learn the radio-based position estimation or to calculate the radio-based second position information on the basis of the reliability of the camera-based position estimation. Furthermore, the use of the radio reception information enables calculation of the reliability more accurately, making it possible to enhance the accuracy of the learning processing of the radio parameters and the position estimation processing by the radio.

Fourth Embodiment

While each of the embodiments described above is a case where there is an imager on the position estimating apparatus 1 side, the present invention is not limited to this configuration. That is, the target terminal 40 may include the imager, and the position may be estimated using the imaging information captured by the imager provided in the target terminal 40.

Figure 8:
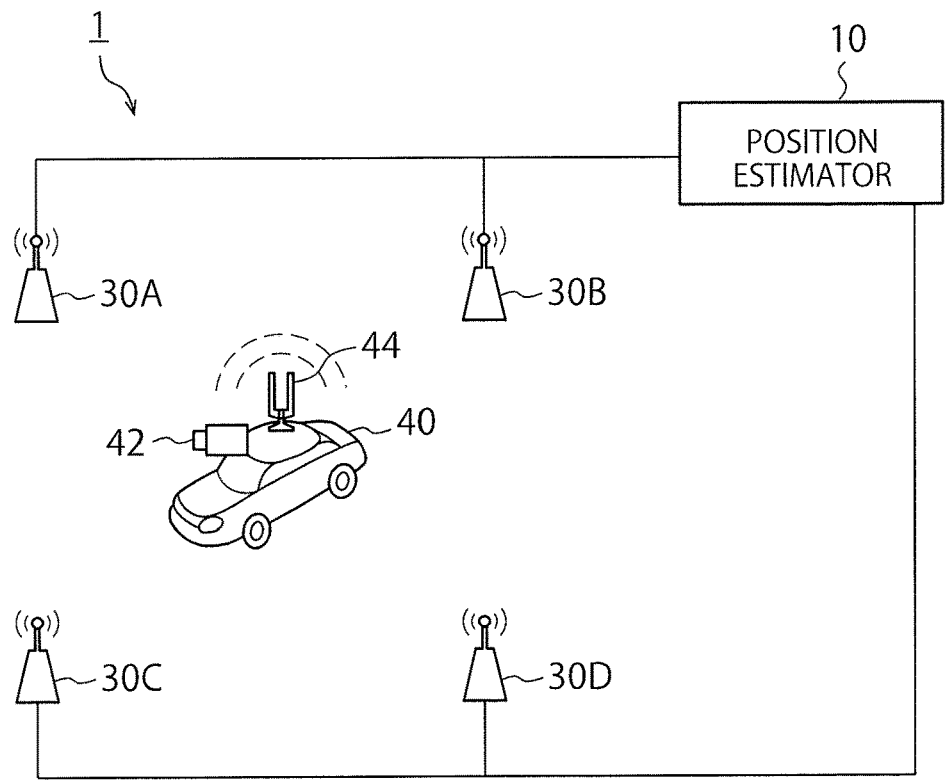
FIG. 8 is a diagram illustrating a configuration of a position estimating apparatus according to an embodiment.

FIG. 8 is a diagram schematically illustrating the position estimating apparatus 1 and the target terminal 40 according to the present embodiment. As illustrated in FIG. 8, the target terminal 40 according to the present embodiment includes an imager 42. The target terminal 40 obtains imaging information using its imager 42, transmits imaging information to the position estimator 10 via a communicator 44 to perform position estimation.

Operation of the position estimator 10 using the imaging information and the radio reception information is similar to the operation in each of the above-described embodiments.

As described above, according to the present embodiment, it is possible to perform position estimation similar to the estimation in each of the above-described embodiments by a camera or the like included in the target terminal 40.

Modification of Fourth Embodiment

Figure 9:
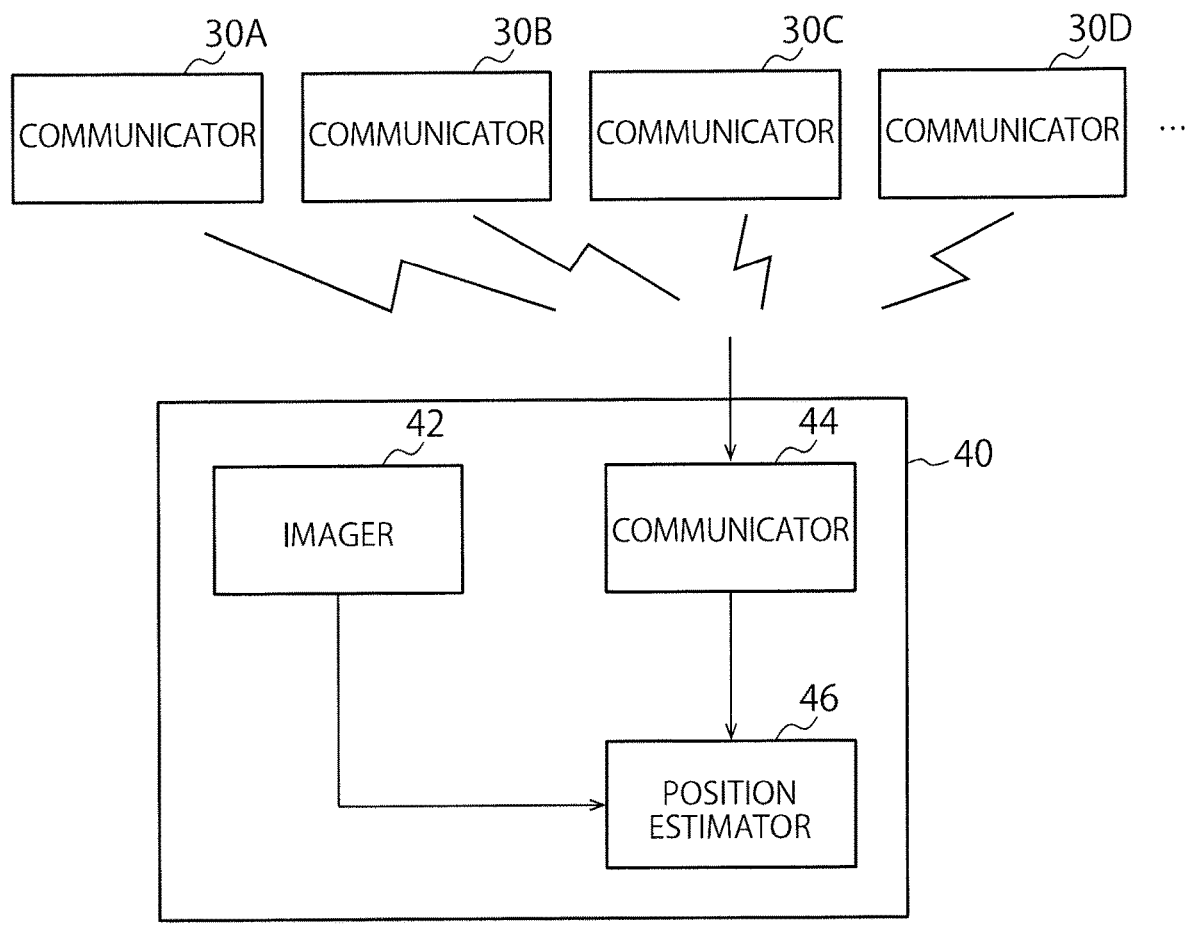
FIG. 9 is a block diagram illustrating functions of a target terminal according to an embodiment.

FIG. 9 is a diagram illustrating a configuration of the target terminal 40 and the communicator 30 according to a modification of the above-described fourth embodiment.

The target terminal 40 includes the imager 42, the communicator 44, and a position estimator 46.

The imager 42 corresponds to the imager 20 of the above-described embodiment, the communicator 44 corresponds to a communicator 30, and the position estimator 46 corresponds to the position estimator 10. In this manner, the target terminal 40 may include necessary functions.

The position estimator 46 of the target terminal 40 performs position estimation of oneself (hereinafter referred to as self-position estimation) using imaging information captured by the imager 42. In this manner, the first position information of oneself is estimated from the imaging information captured by the imager 42.

The self-position estimation may be performed by calculating a distance to a feature point included in imaging information by the imager 42 or by using a technique of simultaneous localization and mapping (SLAM) of simultaneously performing object recognition and environment map creation.

The position estimator 46 may obtain the reliability in estimating the first position information, that is, the reliability of self-position estimation. Acquisition of the reliability of self-position estimation is performed on the basis of the number of feature points, the brightness of the imaging environment, or the like.

The communicator 44 receives radio signals from the surrounding communicators 30A to 30D and performs position estimation processing using the radio reception information. In a case where the position estimator 46 determines that the reliability of the self-position estimation in the target terminal 40 is high, the position estimator 46 may use the self-position as the second position information based on the self-position estimation result. Similarly to the above-described embodiment, correction may be performed on the basis of the reception information of radio waves transmitted from the communicator 30 to estimate the second position information. Note that the reliability need not necessarily be determined, similarly to the above-described embodiment. Moreover, the number of communicators 30 may be any number.

Furthermore, the position estimator 46 may learn the radio parameter on the basis of the self-position estimation result. Then, in a case where it is determined that the reliability is low, the second position information based on the radio reception information may be estimated using the learned radio parameter to set the second position information as the self-position. With this configuration, it is possible to perform highly accurate self-position estimation using both the camera-based and the radio-based estimation, similarly to each of the above-described embodiments.

As illustrated in FIG. 1, the estimated position information may be held by the position estimator 10 outside the target terminal 40, or may be held in the position estimator 46. Alternatively, the information may be transmitted to a server (not illustrated) or the like. With the above-described configuration, even in a case where the position estimator 10 is not provided outside, the communicator 30 is controlled to perform position estimation in the position estimator 46, enabling the target terminal 40 including the camera and a radio function to know its self-position accurately.

The components of the position estimating apparatus 1 of the present embodiments may be implemented by dedicated hardware such as an integrated circuit (IC) on which a processor or the like is mounted. For example, the position estimating apparatus 1 may include a reception circuit to implement the receiver in the communicator 30 or the communicator 44, a transmission circuit to implement the transmitter, and a control (processing) circuit as a controller to implement the position estimator 10 or the position estimator 46. The internal configuration of the controller may also be implemented by a dedicated circuit. Alternatively, the components may be implemented using software (a program). In the case of using software (program), the above-described embodiments can be implemented by using a general-purpose computer apparatus as basic hardware and causing a processor such as a central processing unit (CPU) mounted on the computer apparatus to execute the program. In a case where a portion of the function is configured by software, a program to implement at least a portion of the function of the position estimating apparatus 1 may be stored in a recording medium such as a flexible disk and a CD-ROM to be loaded on a computer to be executed. The recording medium is not limited to a detachable one such as a magnetic disk and an optical disk, and may be a fixed type recording medium such as a hard disk apparatus and a memory.

Moreover, a program to implement at least a portion of the function of the position estimating apparatus 1 may be distributed via a communication channel (including radio communication) such as the Internet. Furthermore, the program may be encrypted, modulated, or compressed, and then distributed via a wired or radio channels including the Internet, or may be stored in a recording medium to be distributed.

The terms used in the present embodiment are to be interpreted broadly. For example, the term "processor" may include a general-purpose processor, a central processing unit (CPU), a microprocessor, a digital signal processor (DSP), a controller, a microcontroller, and a state machine. Depending on the situation, the "processor" may refer to an application specific integrated circuit (ASIC), a field programmable gate array (FPGA), a programmable logic circuit (PLD), or the like. The "processor" may refer to a combination of processing apparatuses such as a plurality of microprocessors, a combination of a DSP and a microprocessor, and one or more microprocessors cooperating with a DSP core.

As another example, the term "memory" may include any electronic component capable of storing electronic information. The "memory" can be a random access memory (RAM), read only memory (ROM), programmable read only memory (PROM), erasable programmable read only memory (EPROM), electrically erasable PROM (EEPROM), nonvolatile random access memory (NVRAM), flash memory, magnetic or optical data storage, being readable by the processor. In a case where the processor executes both or one of reading and writing of information onto the memory, this can be referred to as electric communication of the memory with the processor. The memory may be integrated into the processor, and this case can also be referred to as electric communication of the memory with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The communicator 30 or the communicator 44, for example, obtains radio reception information by using radio waves, but it is not limited thereto. In addition to the radio waves, radio reception information may be obtained using other means such as acoustic waves, light waves to perform position estimation.

The invention claimed is:

1. An electronic apparatus for estimating a position of a target apparatus external to the electronic apparatus, the electronic apparatus comprising:
 receiver circuitry configured to receive a radio wave sent from the target apparatus, the radio wave including radio information available for estimating the position of the target apparatus; and
 controller circuitry configured to:
  estimate first position information of the target apparatus based on a captured image of the target apparatus; and
  estimate second position information of the target apparatus based on the radio wave,
 wherein the controller circuitry is configured to learn, based on the radio wave, a radio parameter related to the radio information and available for estimating the position of the target apparatus to estimate the second position information of the target apparatus by using the first position information; and
 wherein the controller circuitry is configured to obtain a degree of reliance of the first position information on the basis of the captured image.

2. The electronic apparatus according to claim 1, wherein the controller circuitry is configured to obtain degree of reliance of the first position information on the basis of the radio wave.

3. The electronic apparatus according to claim 1, wherein the controller circuitry is configured to learn the radio parameter on the basis of the radio wave and the degree of reliance of the first position information in addition to the first position information.

4. The electronic apparatus according to claim 3,
 wherein the controller circuitry is configured to update the radio parameter on the basis of the radio wave and the first position information in a case where the degree of reliance of the first position information is a threshold or more; and the controller circuitry is configured not to update the radio parameter in a case where the degree of reliance of the first position information is less than the threshold.

5. The electronic apparatus according to claim 4, wherein the controller circuitry is configured to:

estimate the second position information on the basis of the first position information in a case where the degree of reliance of the first position information is equal to the threshold or more, and estimate the second position information on the basis of the radio wave and the radio parameter in a case where the degree of reliance of the first position information is less than the threshold.

6. The electronic apparatus according to claim 1, further comprising:

transmitter circuitry configured to transmit information; and at least one antenna configured to connect to the receiver circuitry and the transmitter circuitry.

7. The electronic apparatus according to claim 1, wherein the radio information includes at least one of received power, reception timing, reception direction, indication of a decoding result, an error vector magnitude of the radio wave, or a frequency spectrum.

8. A position estimating method comprising:

receiving a radio wave sent from a target, the radio wave including radio information available for estimating a position of the target;

estimating first position information of the target based on a captured image of the target;

learning, based on the radio wave, a radio parameter related to the radio information and available for estimating the position of the target by using the first position information;

estimating second position information of the target based on the radio wave using the learned radio parameter; and obtaining a degree of reliance of the first position information on the basis of the captured image.

9. A terminal apparatus comprising:

an imager configured to capture an image of the terminal apparatus;

receiver circuitry configured to receive a radio wave from a communicator, the radio wave including radio information available for estimating a position of oneself; and controller circuitry configured to:

estimate first position information of oneself using information of the captured image;

learn, based on the radio wave, a radio parameter related to the radio information, the radio parameter available for estimating the position of oneself;

estimate second position information of oneself using the learned radio parameter and the first position information; and obtaining a degree of reliance of the first position information on the basis of the captured image.

* * * * *